United States Patent
Wu et al.

(10) Patent No.: US 8,249,204 B2
(45) Date of Patent: Aug. 21, 2012

(54) APPARATUS AND METHOD FOR CHANNEL STATE INFORMATION FEEDBACK

(75) Inventors: Wen-Rong Wu, Hsinchu (TW); Tzu-Han Hsu, Kaohsiung (TW); Jen-Yuan Hsu, Jincheng Township (TW); Pang-An Ting, Fongyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 915 days.

(21) Appl. No.: 12/339,000

(22) Filed: Dec. 18, 2008

(65) Prior Publication Data

US 2010/0008431 A1   Jan. 14, 2010

Related U.S. Application Data

(60) Provisional application No. 61/079,980, filed on Jul. 11, 2008.

(51) Int. Cl.
*H03D 1/04* (2006.01)
(52) U.S. Cl. ...................................................... 375/346
(58) Field of Classification Search .................. 375/227, 375/267, 284, 296, 346, 358
See application file for complete search history.

(56) References Cited

U.S. PATENT DOCUMENTS 7,430,245 B2 * 9/2008 Ketchum et al. .............. 375/267
7,746,802 B2 * 6/2010 Suh et al. ...................... 370/252

OTHER PUBLICATIONS

Love, Daniel J., et al., "Grassmannian Beamforming for Multiple-Input Multiple-Output Wireless Systems", IEEE Transactions on Information Theory, vol. 49, No. 10, Oct. 2003.
Yu, Dongsheng, et al., "Proposal for IEEE 802.16m Uplink Sounding Pilot", IEEE C802.16m-08/349, May 5, 2008.

* cited by examiner

*Primary Examiner* — Kevin Kim
(74) *Attorney, Agent, or Firm* — Finnegan, Henderson, Farabow, Garrett & Dunner, LLP

(57) ABSTRACT

A method for a mobile station to provide to a base station feedback of channel state information (CSI) regarding a plurality of communication channels between the mobile station and the base station. The method includes: estimating the CSI by calculating a plurality of channel responses each for one of the communication channels; compressing the estimated CSI; and sending the compressed CSI as the feedback to the base station.

28 Claims, 17 Drawing Sheets

APPARATUS AND METHOD FOR CHANNEL STATE INFORMATION FEEDBACK

RELATED APPLICATIONS

This application is based upon and claims the benefit of priority from U.S. Provisional Patent Application No. 61/079,980, filed Jul. 11, 2008, the entire contents of which are incorporated herein by reference.

FIELD OF THE INVENTION

This invention relates to apparatus and method for channel state information (CSI) feedback.

BACKGROUND OF THE INVENTION

Recently, there has been great interest in multi-input and multi-output (MIMO) systems, which use multiple antennas on both a transmitter side and a receiver side of a communication system to improve communication performance. For example, in a MIMO system, a base station may utilize multiple transmitting antennas to transmit data to a mobile station, and the mobile station may utilize multiple receiving antennas to receive the data.

Because there are multiple transmitting antennas and multiple receiving antennas in the MIMO system, a communication channel is established between each of the transmitting antennas and each of the receiving antennas. Accordingly, a plurality of communication channels are established between the base station and the mobile station.

In practice, the base station may need knowledge of information regarding the communication channels to improve throughput of the MIMO system. For example, the base station may perform bandwidth resource allocation and signal modulation based on the information regarding the communication channels. In addition, the base station may perform MIMO mode selection and pre-coder selection based on the information regarding the communication channels.

To facilitate improvement of throughput of the MIMO system, the mobile station may estimate information regarding the communication channels between the base station and the mobile station, i.e., channel state information (CSI), based on signals received from the base station, and then provide to the base station feedback of the estimated CSI.

SUMMARY OF THE INVENTION

In accordance with the invention, there is provided a method for a mobile station to provide to a base station feedback of channel state information (CSI) regarding a plurality of communication channels between the mobile station and the base station, the method comprising: estimating the CSI by calculating a plurality of channel responses each for one of the communication channels; compressing the estimated CSI; and sending the compressed CSI as the feedback to the base station.

Also in accordance with the invention, there is provided a mobile station to provide to a base station feedback of channel state information (CSI) regarding a plurality of communication channels between the mobile station and the base station, the mobile station being configured to: estimate the CSI by calculating a plurality of channel responses each for one of the communication channels; compress the estimated CSI; and send the compressed CSI as the feedback to the base station.

Further in accordance with the invention, there is provided a method for a base station to acquire from a mobile station feedback of channel state information (CSI) regarding a plurality of communication channels between the base station and the mobile station, the method comprising: receiving the feedback from the mobile station, the feedback including compressed CSI; and reconstructing, based on the compressed CSI, a plurality of channel responses each for one of the communication channels.

Further in accordance with the invention, there is provided a base station to acquire from a mobile station feedback of channel state information (CSI) regarding a plurality of communication channels between the base station and the mobile station, the base station being configured to: receive the feedback from the mobile station, the feedback including compressed CSI; and reconstruct, based on the compressed CSI, a plurality of channel responses each for one of the communication channels.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of apparatus and methods consistent with aspects related to the invention as recited in the appended claims.

Figure 1:
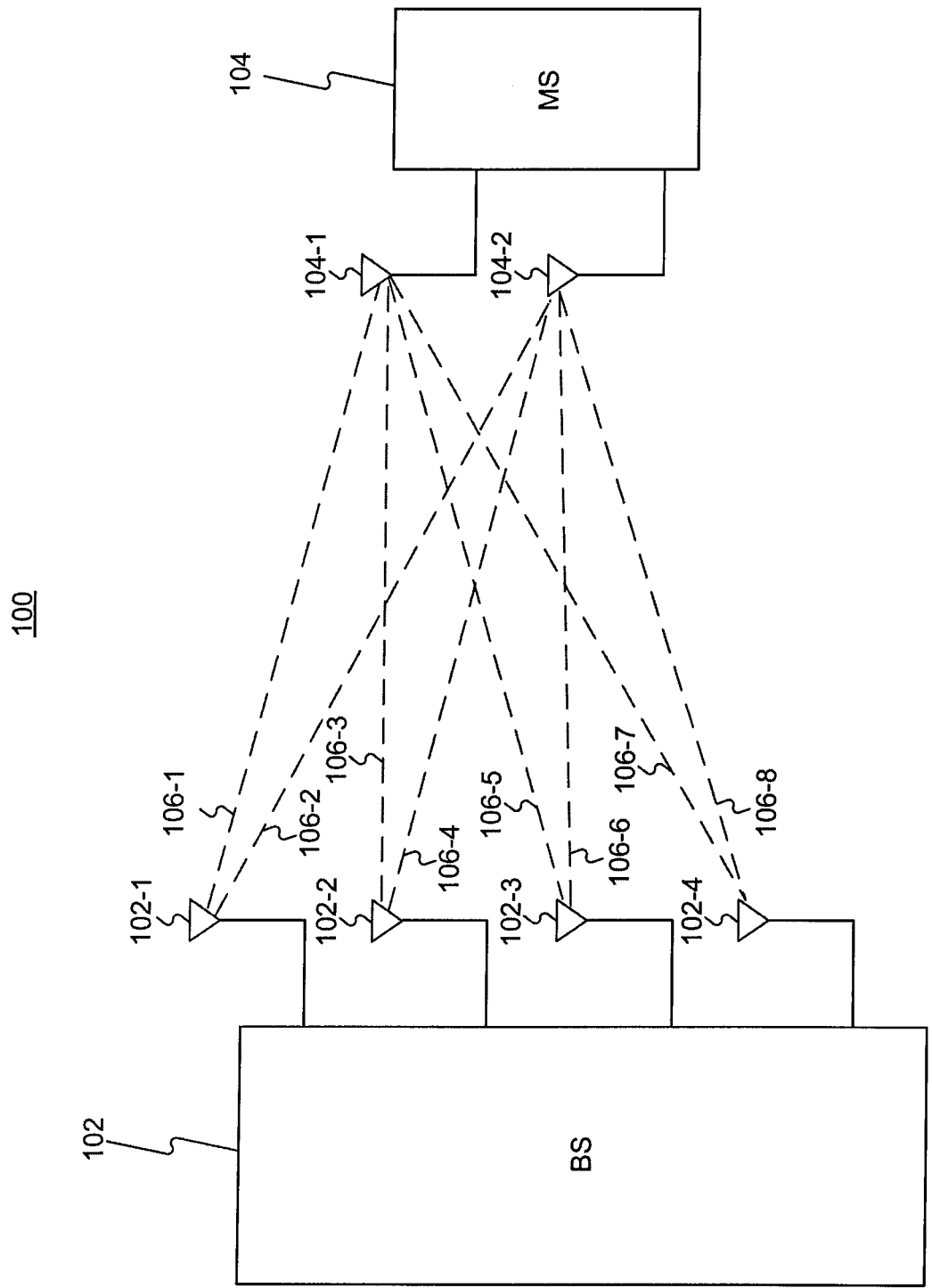
FIG. 1 illustrates a schematic block diagram of a wireless communication system, according to an exemplary embodiment.

FIG. 1 illustrates a schematic block diagram of a wireless communication system 100, according to an exemplary embodiment. The communication system 100 includes a base station (BS) 102 and a mobile station (MS) 104. For example, the communication system 100 is a multi-input and multi-output (MIMO) system. Accordingly, the base station 102 may include a plurality of transmitting antennas 102-1, 102-2, ..., 102-$N_T$ ($N_T$ is the total number of the transmitting antennas), and the mobile station 104 may include a plurality of receiving antennas 104-1, 104-2, ..., 104-$N_R$ ($N_R$ is the total number of the receiving antennas). For illustrative purposes only, it is assumed the base station 102 includes first, second, third, and fourth transmitting antennas 102-1, 102-2, 102-3, and 102-4, and the mobile station 104 includes first and second receiving antennas 104-1 and 104-2.

In embodiments consistent with the present invention, the base station 102 may transmit signals to the mobile station 104 using the transmitting antennas 102-1, 102-2, 102-3, and 102-4. The mobile station 104 may receive the signals transmitted by the base station 102 using the receiving antennas 104-1 and 104-2. The mobile station 104 may further estimate channel state information (CSI) for communication channels between the base station 102 and the mobile station 104, based on the received signals, and send to the base station 102 the estimated CSI as CSI feedback. The base station 102 may then perform bandwidth resource allocation and signal modulation based on the CSI feedback received from the mobile station 104. In addition, the base station 102 may perform MIMO mode selection and pre-coder selection based on the CSI feedback. It is to be understood that embodiments consistent with the present invention may be implemented in hardware and/or software.

For example, a communication channel is established between each of the transmitting antennas 102-1, ..., 102-4 and each of the receiving antennas 104-1 and 104-2. In the illustrated embodiment, there are eight communication channels 106-1, 106-2, ..., 106-8 established between the base station 102 and the mobile station 104. Each of the communication channels 106-1, 106-2, ..., 106-8 corresponds to a pair of transmitting and receiving antennas.

In embodiments consistent with the present invention, the mobile station 104 may estimate CSI for each of the communication channels 106-1, 106-2, ..., 106-8, by calculating a plurality of channel responses, each for one of the communication channels 106-1, 106-2, ..., 106-8.

Figure 2:
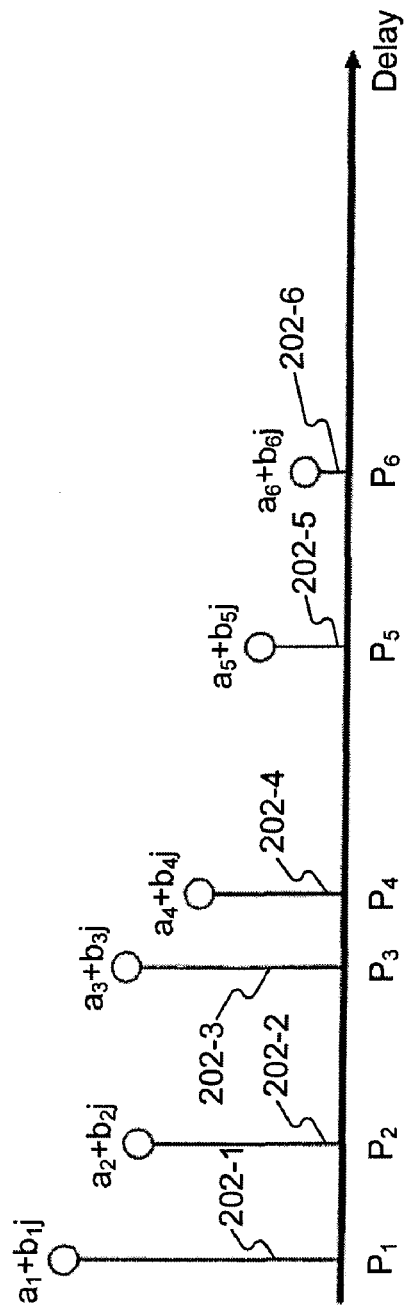
FIG. 2 shows an exemplary channel response calculated for a communication channel, according to an exemplary embodiment.

FIG. 2 shows an exemplary channel response 200 calculated for a communication channel, according to an exemplary embodiment. For example, the channel may be any one of the communication channels 106-1, 106-2, ..., 106-8 (FIG. 1). The channel response 200 includes a plurality of channel taps, such as channel taps 202-1, 202-2, ..., 202-6, each corresponding to a time delay and having a complex value. A channel tap is a single sample of a channel response at a specific time delay. For convenience of illustration, only channel taps that have a magnitude larger than a threshold value, e.g., the channel taps 202-1, 202-2, ..., 202-6, are shown in FIG. 2. Each of the channel taps 202-$i$ (i=1, 2, ..., 6) corresponds to a time delay $P_i$ (i=1, 2, ..., 6) and has a complex value $a_i+b_i j$ (i=1, 2, ..., 6), where j is an imaginary unit. In other words, each of the channel taps 202-1, 202-2, ..., 202-6 has a magnitude and a phase. Estimated CSI for the communication channel may include the time delays $P_1, P_2, ..., P_6$, the magnitudes, and the phases, of the channel taps 202-1, 202-2, ..., 202-6.

Referring back to FIG. 1, in exemplary embodiments consistent with the present invention, the mobile station 104 may estimate CSI for the communication channels 106-1, 106-2, ..., 106-8, and send the estimated CSI as CSI feedback to the base station 102. For example, for each of the communication channels 106-1, 106-2, ..., 106-8, the mobile station 104 may select channel taps that have a magnitude larger than a threshold value in a calculated channel response, such as the channel taps 202-1, 202-2, ..., 202-6 (FIG. 2). The mobile station 104 may quantize information regarding time delays and phases of the selected channel taps. The mobile station 104 may further compress the estimated CSI by generating a plurality of parameters to represent information regarding magnitudes of the selected channel taps, based on methods consistent with the present invention, as described below, and quantize the generated parameters. The mobile station 104 then sends to the base station 102 the quantized parameters, together with the quantized information regarding the time delays and the phases of the selected channel taps.

Figure 3A:
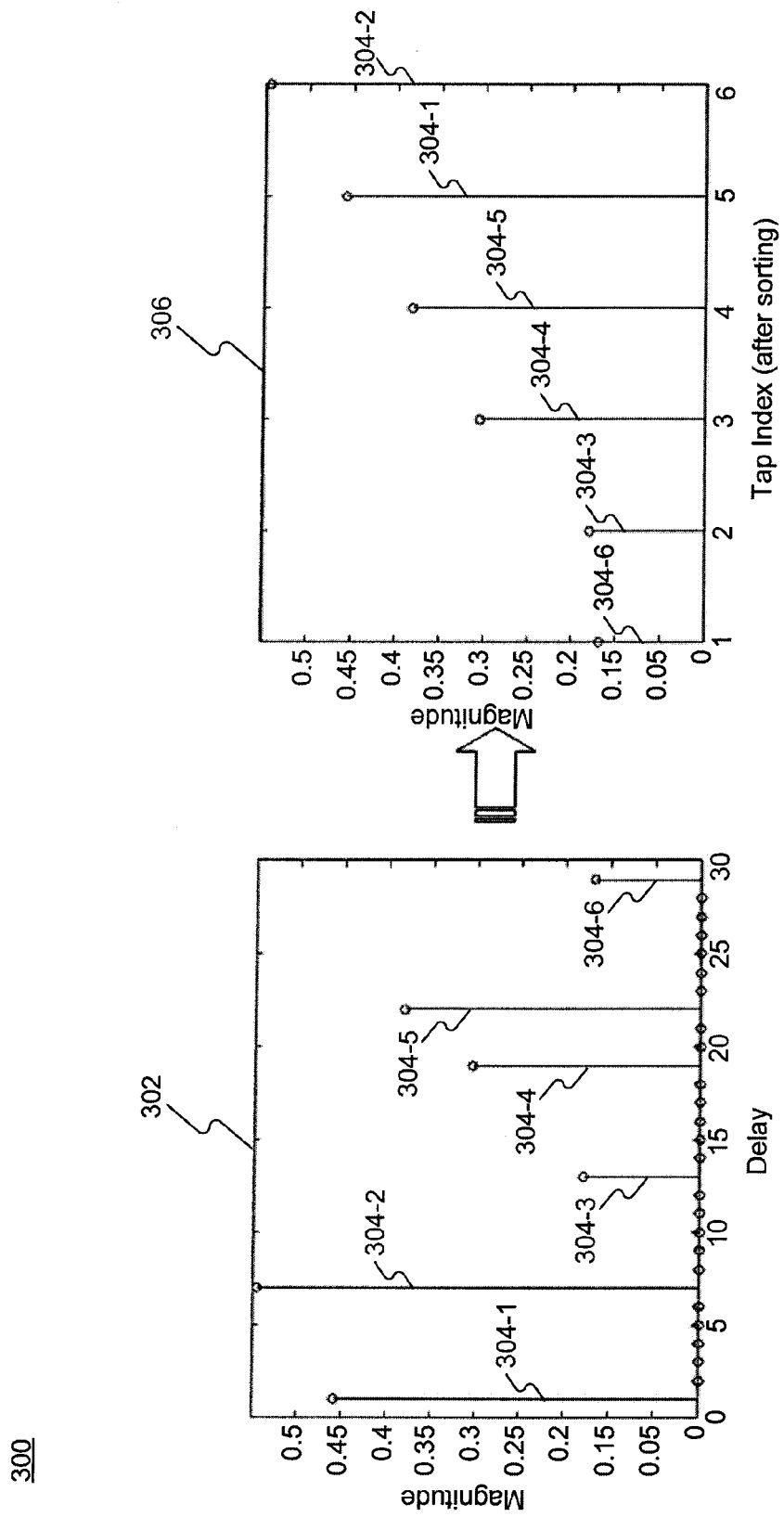
FIGS. 3A-3C illustrate a method for a mobile station to compress estimated CSI for a communication channel, according to an exemplary embodiment.
Figure 3B:
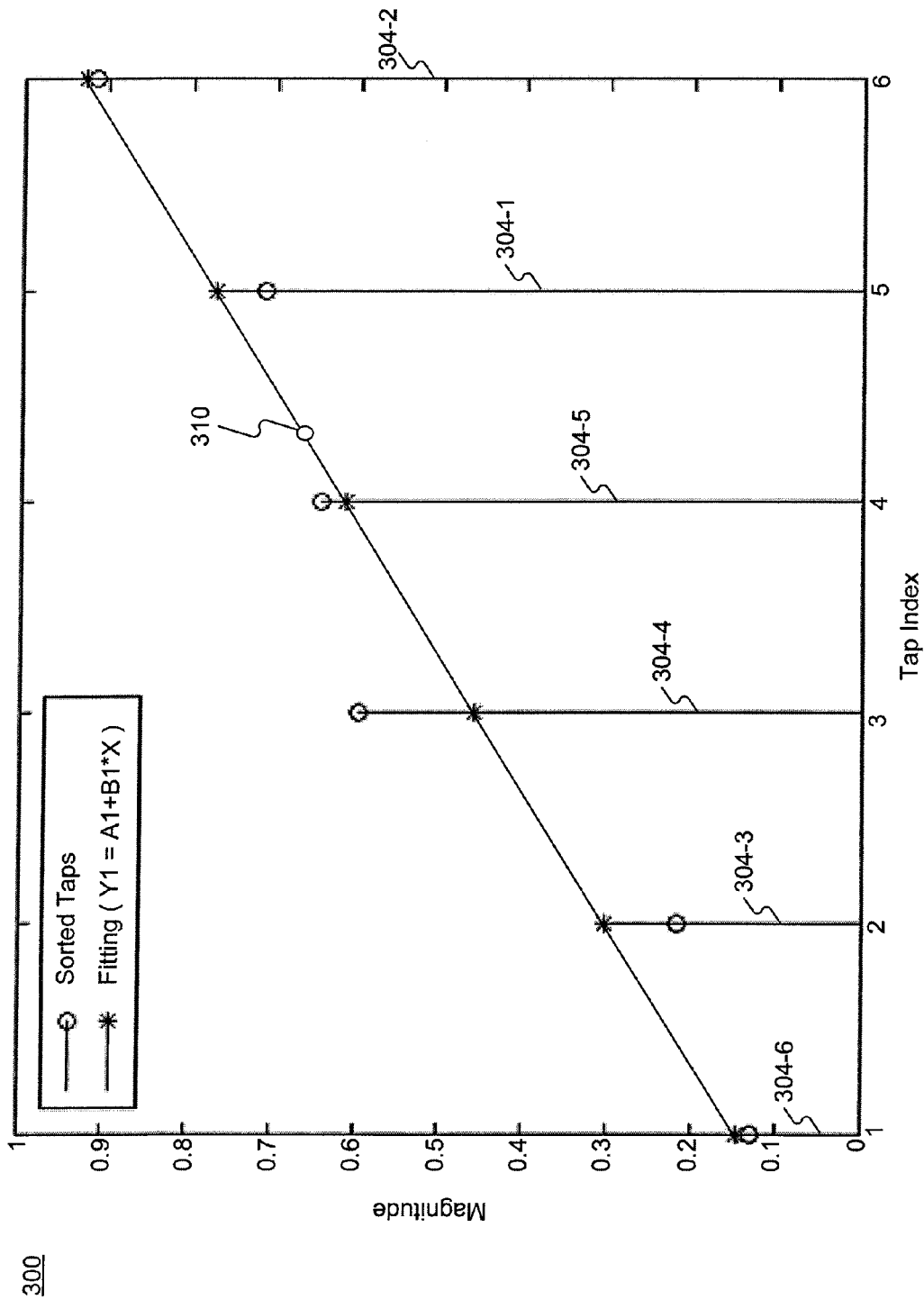
Figure 3C:
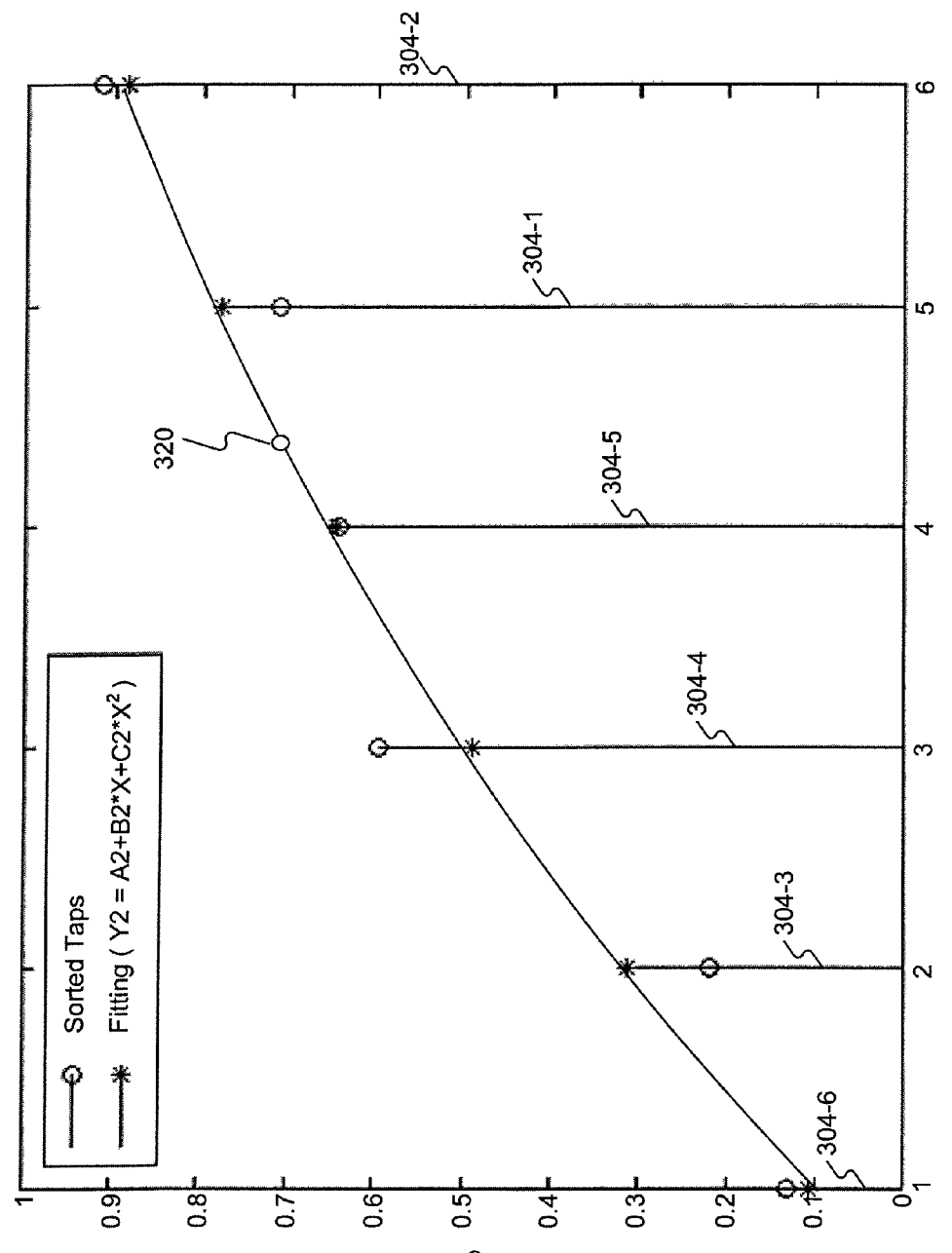

FIGS. 3A-3C illustrate a method 300 for the mobile station 104 (FIG. 1) to compress estimated CSI for a communication channel, according to an exemplary embodiment. For example, the communication channel may be any one of the communication channels 106-1, 106-2, ..., 106-8 (FIG. 1).

Referring to FIGS. 1 and 3A-3C, the mobile station 104 estimates CSI for the communication channel by calculating a channel response 302 for the communication channel. The calculated channel response 302 includes information regarding time delays, magnitudes, phases (not shown) of a plurality of channel taps. In the illustrated embodiment, only the first thirty of the plurality channel taps are shown in the channel response 302, as indicated by the small circles, because remaining ones of the channel taps each have a magnitude of zero or close to zero, and may be ignored.

In embodiments consistent with the present invention, the mobile station 104 may select ones of the plurality of channel taps that have a magnitude larger than a threshold value, as noted above. The mobile station 104 may further sort the selected channel taps based on magnitudes of the selected channel taps, such that a first one of the sorted channel taps has, e.g., a smallest magnitude, and a last one of the sorted channel taps has, e.g., a largest magnitude. In the illustrated embodiment, the mobile station 104 selects channel taps 304-1, 304-2, ..., 304-6, and further sorts the selected channel taps 304-1, 304-2, ..., 304-6 based on the magnitudes of the channel taps 304-1, 304-2, ..., 304-6. The sorted channel taps 304-1, 304-2, ..., 304-6 are shown as a sorted channel response 306.

In exemplary embodiments consistent with the present invention, a least squares (LS) method may be applied to the sorted channel response 306. The least squares method is a method of fitting data. For example, N observed data samples $y_1, y_2, ..., y_N$ may be denoted by a vector $\overline{Y}$ as follows:

$$\overline{Y}=[y_1 y_2 \ldots y_N]^T, \quad \text{Equation (1)}$$

where "T" denotes matrix transposition. Based on the least squares method, a square error $J(\overline{\theta})$ can be expressed as follows:

$$J(\overline{\theta})=(\overline{Y}-K\overline{\theta})^T(\overline{Y}-K\overline{\theta}), \quad \text{Equation (2)}$$

where "K" is a known observation matrix, and $\overline{\theta}$ is a vector including a plurality of parameters. For example, for fitting the data samples $y_1, y_2, \ldots, y_N$ with a line having two parameters, K can be expressed as $$K = \begin{bmatrix} 1 & 0 \\ 1 & 1 \\ \vdots & \vdots \\ 1 & N-1 \end{bmatrix}. \quad \text{Equation (3)}$$

Also for example, for fitting the data samples $y_1, y_2, \ldots, y_N$ with a curve having three parameters, K can be expressed as $$K = \begin{bmatrix} 1 & 0 & 0^2 \\ 1 & 1 & 1^2 \\ \vdots & \vdots & \vdots \\ 1 & N-1 & (N-1)^2 \end{bmatrix}. \quad \text{Equation (4)}$$

Equation (2) indicates that different values of the vector $\overline{\theta}$ may lead to different values of the square error $J(\overline{\theta})$. Based on the least squares method, a value of the vector $\overline{\theta}$, $\hat{\theta}_{LS}$, may be identified or generated such that the square error $J(\overline{\theta})$ may be minimized, and $\hat{\theta}_{LS}$ can be calculated as follows:

$$\hat{\theta}_{LS} = (K^T K)^{-1} \cdot K^T \overline{Y}. \quad \text{Equation (5)}$$

In embodiments consistent with the present invention, $\hat{\theta}_{LS}$ may be used to represent the observed data samples $y_1, y_2, \ldots, y_N$. For example, the magnitudes of the sorted channel taps 304-1, 304-2, ..., 304-6 may be considered as observed data samples. Based on the least squares method, a line or curve may be used to fit the magnitudes of the sorted channel taps 304-1, 304-2, ..., 304-6, the line or curve having a plurality of parameters. Therefore, the parameters of the line or curve may be used to represent information regarding the magnitudes of the sorted channel taps 304-1, 304-2, ..., 304-6.

In one exemplary embodiment, shown in FIG. 3B, a line Y1 310 may be used to fit the magnitudes of the sorted channel taps 304-1, 304-2, ..., 304-6. Mathematically, the line Y1 310 may be expressed with first and second parameters A1 and B1 as Y1=A1+B1*X, where X represents tap indexes. Therefore fitting based on a line may also be referred to as two-parameter fitting. In the illustrated embodiment shown in FIG. 3B, the small circles correspond to the magnitudes of the sorted channel taps 304-1, 304-2, ..., 304-6, and the small stars on the line Y1 310 correspond to magnitudes of the sorted channel taps 304-1, 304-2, ..., 304-6 given by the line Y1 310, which may be considered as an approximation of the magnitudes of the sorted channel taps 304-1, 304-2, ..., 304-6.

In exemplary embodiments consistent with the present invention, the mobile station 104 may generate the parameters A1 and B1 to represent information regarding the magnitudes of the channel taps 304-1, 304-2, ..., 304-6, because based on the parameters A1 and B1 and, hence, the line Y1 310, the approximation of the magnitudes of the channel taps 304-1, 304-2, ..., 304-6 may be generated. Typically, a data size of the parameters A1 and B1 is smaller than a data size of the magnitudes of the channel taps 304-1, 304-2, ..., 304-6. Therefore, information regarding the magnitudes of the channel taps 304-1, 304-2, ..., 304-6 may be compressed based on the least squares method, and the parameters A1 and B1 represent the compressed information.

As a result, the mobile station 104 may quantize the parameters A1 and B1 and send to the base station 102 the quantized parameters A1 and B1, together with quantized information regarding time delays and phases of the channel taps 304-1, 304-2, ..., 304-6, as CSI feedback for the communication channel. Based on the CSI feedback, the base station 102 may reconstruct the line Y1 310 and, hence, an approximation of the calculated channel response 302.

In one exemplary embodiment, shown in FIG. 3C, a curve Y2 320 may be used to fit the magnitudes of the sorted channel taps 304-1, 304-2, ..., 304-6. For example, the curve Y2 320 may be a second-order curve, and mathematically, may be expressed as a polynomial with first, second, and third parameters A2, B2, and C2 as Y2=A2+B2*X+C2*X$^2$, where X represents tap indexes. Therefore fitting based on a second-order curve may also be referred to as three-parameter fitting. In the illustrated embodiment shown in FIG. 3C, the small circles correspond to the magnitudes of the sorted channel taps 304-1, 304-2, ..., 304-6, and the small stars on the curve Y2 320 correspond to magnitudes of the sorted channel taps 304-1, 304-2, ..., 304-6 given by the curve Y2 320, which may be considered as an approximation of the magnitudes of the sorted channel taps 304-1, 304-2, ..., 304-6.

In exemplary embodiments consistent with the present invention, the mobile station 104 may generate the parameters A2, B2, and C2 to represent information regarding the magnitudes of the sorted channel taps 304-1, 304-2, ..., 304-6, because based on the parameters A2, B2, and C2 and, hence, the curve Y2 320, the approximation of the magnitudes of the sorted channel taps 304-1, 304-2, ..., 304-6 may be generated. Typically, a data size of the parameters A2, B2, and C2 is smaller than a data size of the magnitudes of the channel taps 304-1, 304-2, ..., 304-6. Therefore information regarding the magnitudes of the channel taps 304-1, 304-2, ..., 304-6 may be compressed based on the least squares method, and the parameters A2, B2, and C2 represent the compressed information.

As a result, the mobile station 104 may quantize the parameters A2, B2, and C2, and send to the base station 102 the quantized parameters A2, B2, and C2, together with quantized information regarding time delays and phases of the channel taps 304-1, 304-2, ..., 304-6, as CSI feedback for the communication channel. Based on the CSI feedback, the base station 102 may reconstruct the line Y2 320 and, hence, an approximation of the calculated channel response 302.

Similarly, in embodiments consistent with the present invention, a high-order curve may be used to fit the magnitudes of the sorted channel taps 304-1, 304-2, ..., 304-6, based on the least squares method. The mobile station 104 may generate parameters of the high-order curve to represent information regarding the magnitudes of the channel taps 304-1, 304-2, ..., 304-6. The mobile station 104 may quantize the generated parameters, and send to the base station 102 the quantized parameters, together with quantized information regarding time delays and phases of the channel taps 304-1, 304-2, ..., 304-6, as CSI feedback for the communication channel. Based on the CSI feedback, the base station 102 may reconstruct the high-order curve and, hence, an approximation of the calculated channel response 302.

Figure 4A:
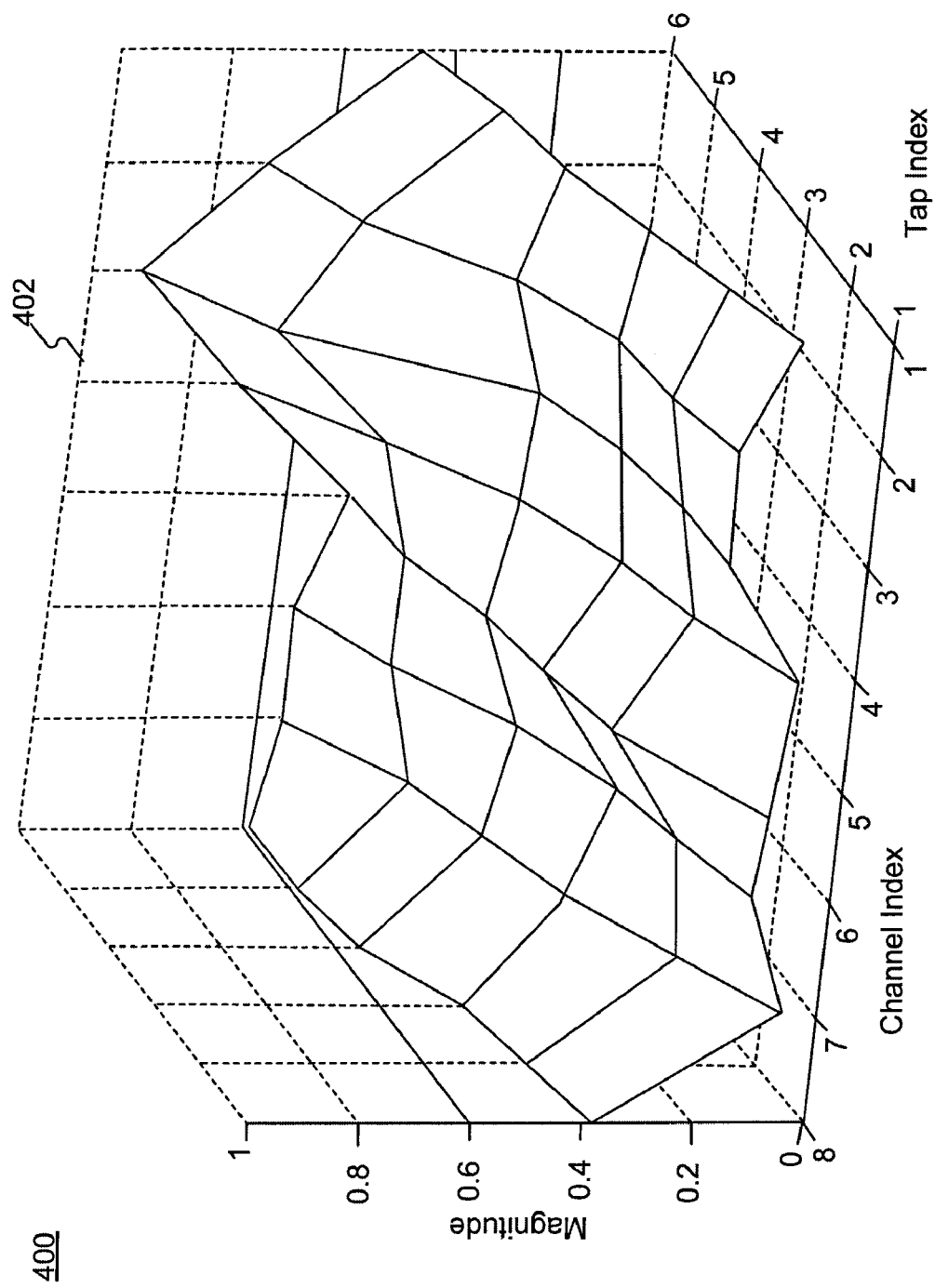
FIGS. 4A and 4B illustrate a method for a mobile station to compress estimated CSI for communication channels, according to an exemplary embodiment.
Figure 4B:
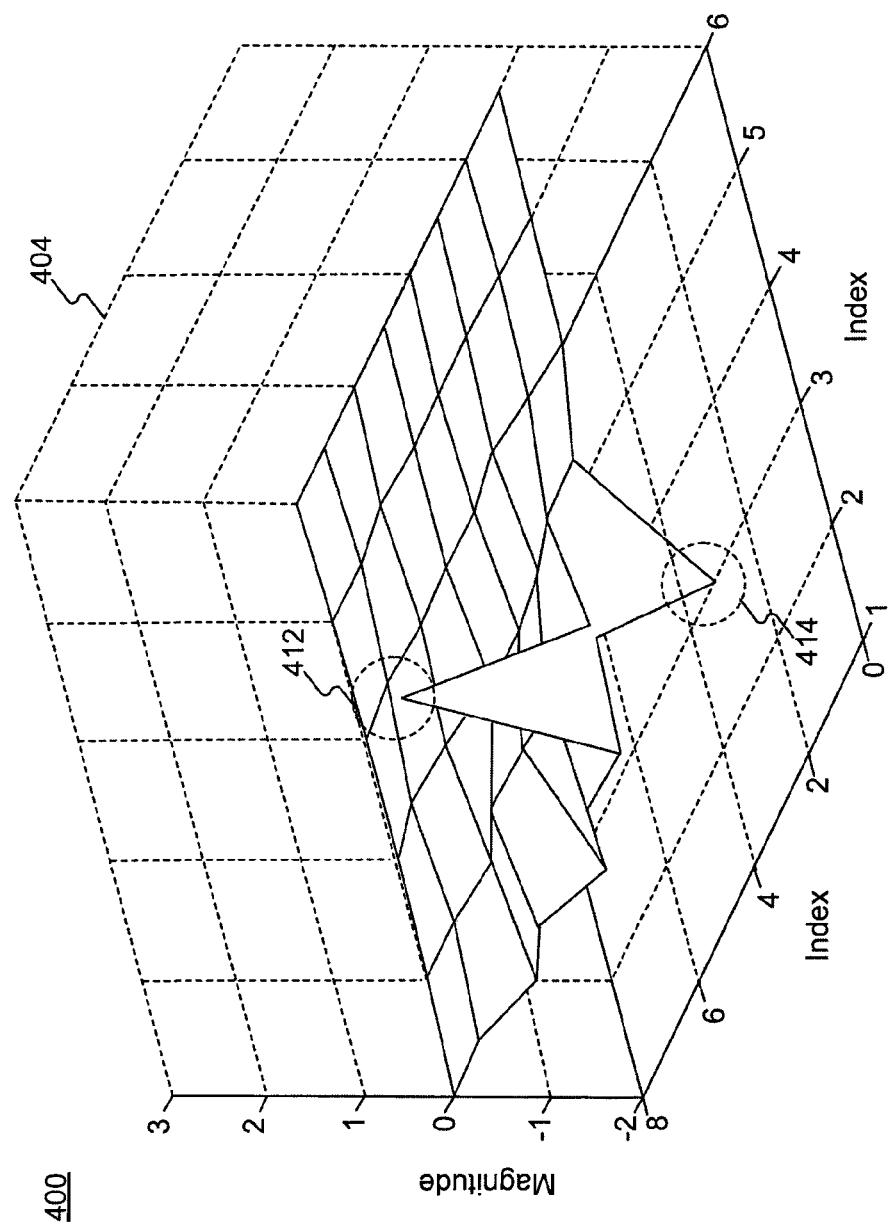

FIGS. 4A and 4B illustrate a method 400 for the mobile station 104 to compress estimated CSI for the communication channels 106-1, 106-2, ..., 106-8 (FIG. 1), according to an exemplary embodiment. Referring to FIGS. 1, 4A, and 4B, for each of the communication channels 106-1, 106-2, ..., 106-8, the mobile station 104 selects channel taps that have a magnitude larger than a threshold value in a calculated channel response, as noted above. The mobile station 104 further sorts, for each of the communication channels 106-1, 106-2, ..., 106-8, the selected channel taps based on magnitudes of the selected channel taps, such that a first one of the sorted channel taps has, e.g., a smallest magnitude, and a last one of the sorted channel taps has, e.g., a largest magnitude, also as noted above. FIG. 4A shows an entire channel response 402 including magnitudes of the sorted channel taps for all of the communication channels 106-1, 106-2, ..., 106-8.

In exemplary embodiments consistent with the present invention, a discrete cosine transform (DCT) may be applied to the entire channel response 402 to generate a spectrum of the entire channel response 402. For example, assume M denotes a total number of the communication channels, N denotes a total number of channel taps for each of the communication channels, and $A_{mn}$ denotes the magnitude of an $n^{th}$ sorted channel tap for an $m^{th}$ communication channel. Then DCT applied to the entire channel response 402 may be expressed as:

$$B_{pq} = \alpha_p \alpha_q \sum_{m=0}^{M-1} \sum_{n=0}^{N-1} A_{mn} \cos\frac{\pi(2m+1)p}{2M} \cos\frac{\pi(2n+1)q}{2N}, \quad \text{Equation (6)}$$

$$0 \le p \le M-1, 0 \le q \le N-1,$$

where $$\alpha_p = \begin{cases} \sqrt{1/M}, & p = 0 \\ \sqrt{2/M}, & 1 \le p \le M-1 \end{cases},$$

$$\alpha_q = \begin{cases} \sqrt{1/N}, & q = 0 \\ \sqrt{2/N}, & 1 \le q \le N-1 \end{cases},$$

"Σ" denotes a summation of a plurality of values, and $B_{pq}$ denotes values of the spectrum of the entire channel response 402.

FIG. 4B shows an exemplary, generated spectrum 404 of the entire channel response 402. Because the channel taps have been sorted for each of the communication channels 106-1, 106-2, ..., 106-8 before the DCT is performed, a small portion of the plurality of values each may have a relatively large magnitude, and a large portion of the plurality of values each may have a relatively small magnitude. For example, as shown in FIG. 4B, values 412 and 414 of the spectrum 404 each have a relatively large magnitude.

In embodiments consistent with the present invention, ones of the plurality of values of the spectrum that have a relatively large magnitude, such as the values 412 and 414, referred to herein as significant parameters, may be selected to represent the spectrum of the entire channel response 402 and, hence, information regarding the magnitudes of the sorted channel taps for the communication channels 106-1, 106-2, ..., 106-8. In other words, significant parameters may be extracted from the magnitudes of the sorted channel taps for the communication channels 106-1, 106-2, ..., 106-8 to represent information regarding the magnitudes of the sorted channel taps. Typically, a data size of the significant parameters is smaller than a data size of the magnitudes of the channel taps for the communication channels 106-1, 106-2, ..., 106-8. Therefore information regarding the magnitudes of the channel taps for the communication channels 106-1, 106-2, ..., 106-8 may be compressed based on the DCT method, and the significant parameters represent the compressed information.

In embodiments consistent with the present invention, the mobile station 104 may quantize the significant parameters and send to the base station 102 the quantized significant parameters, together with quantized information regarding time delays and phases of the channel taps for the communication channels 106-1, 106-2, ..., 106-8, as CSI feedback for the communication channels 106-1, 106-2, ..., 106-8. Based on the CSI feedback, the base station 102 may reconstruct an approximation of the spectrum 404 and, hence, an approximation of the entire channel response 402 by performing an inverse DCT (IDCT).

Figure 5:
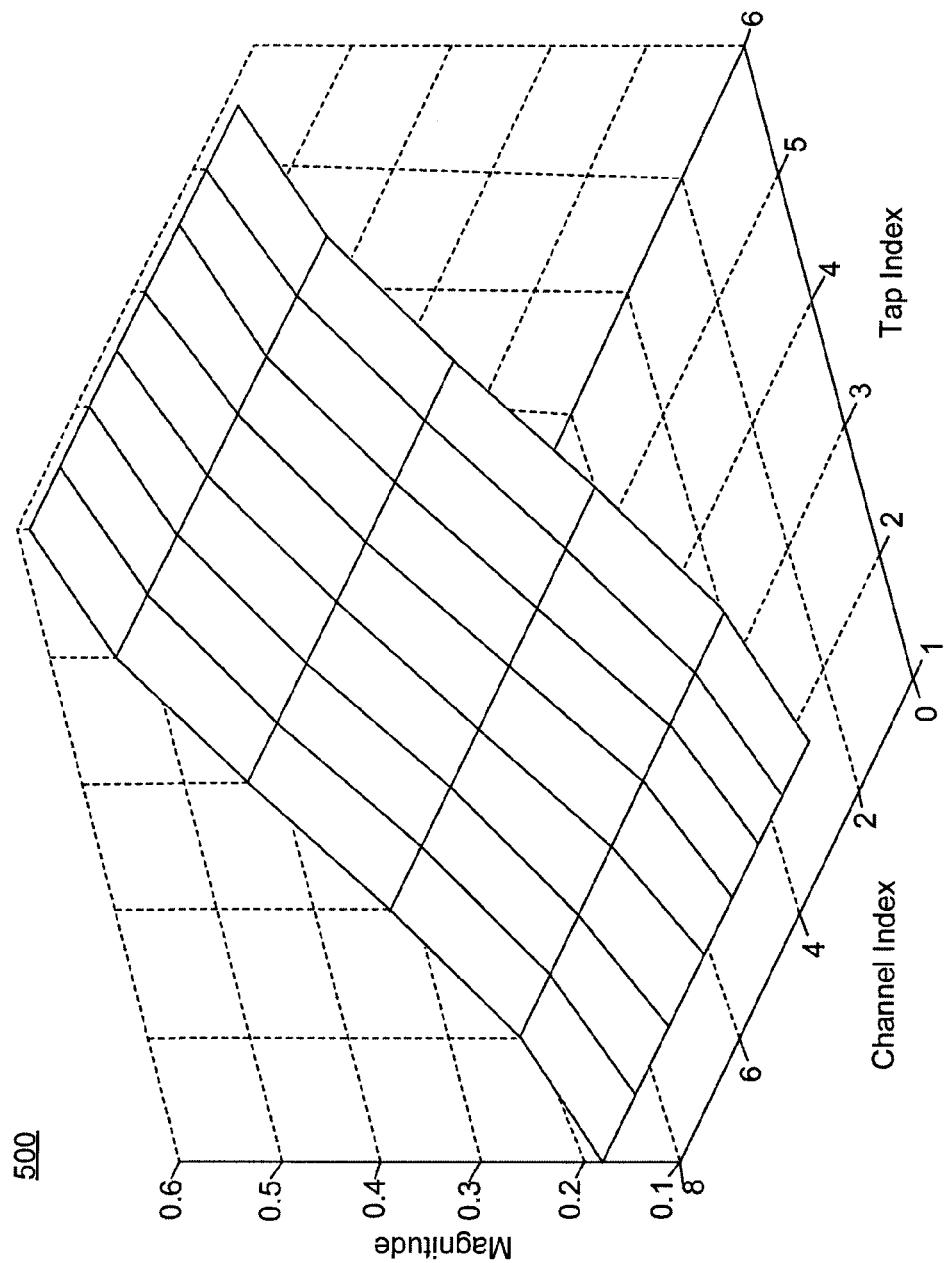
FIG. 5 shows an exemplary reconstructed, entire channel response, according to an exemplary embodiment.

FIG. 5 shows an exemplary reconstructed, entire channel response 500, according to an exemplary embodiment. The entire channel response 500 is reconstructed based on two significant parameters that are selected to represent the spectrum 404 of the entire channel response 402 (FIGS. 4A and 4B). The reconstructed, entire channel response 500 may be considered as an approximation of the entire channel response 402.

Figure 6:
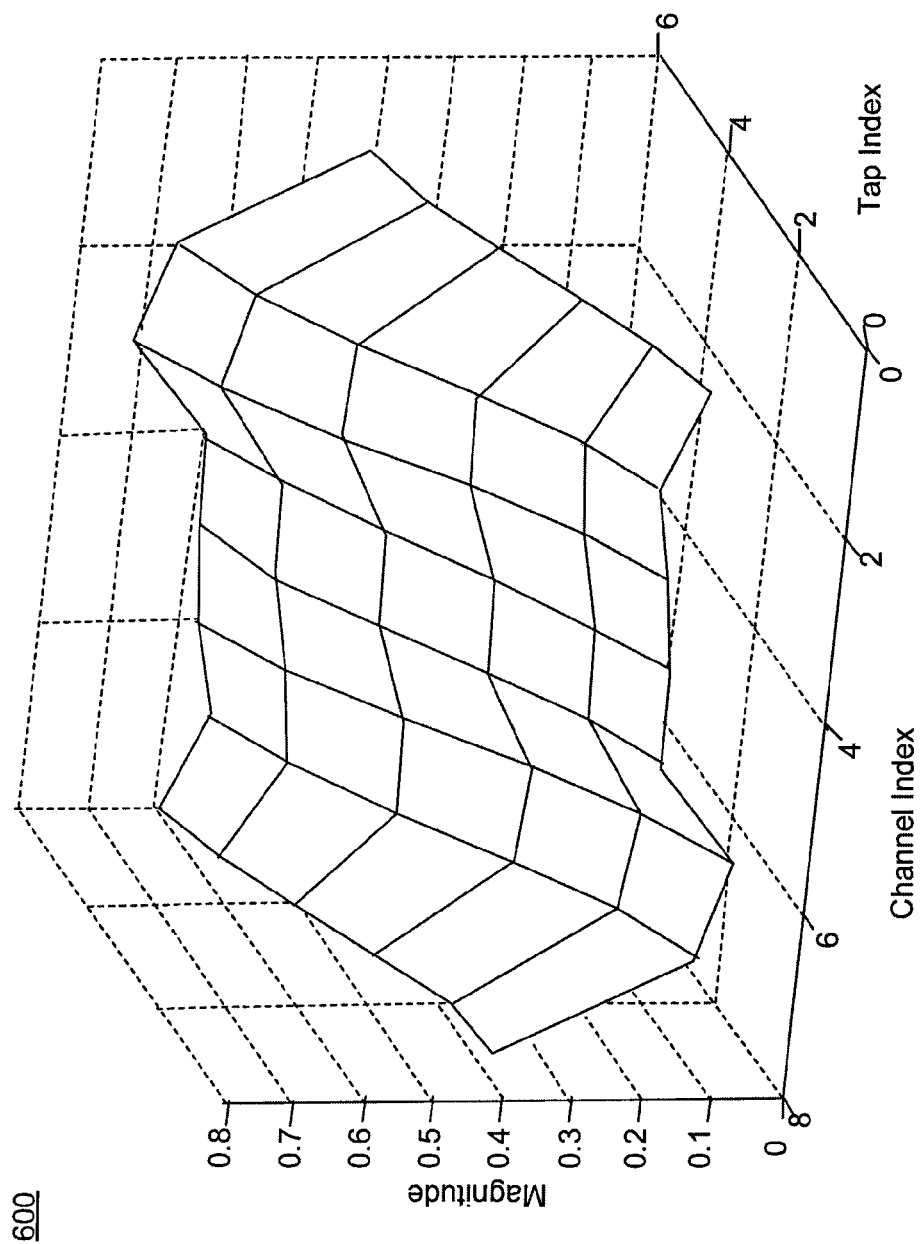
FIG. 6 shows an exemplary reconstructed, entire channel response, according to an exemplary embodiment.

FIG. 6 shows an exemplary reconstructed, entire channel response 600 according to an exemplary embodiment. The entire channel response 600 is reconstructed based on six significant parameters that are selected to represent the spectrum 404 of the entire channel response 402 (FIGS. 4A and 4B). The reconstructed, entire channel response 600 may be considered as an approximation of the entire channel response 402.

In embodiments consistent with the present invention, differential modulation methods, e.g., a differential pulse code modulation (DPCM) method, may be used to further reduce a data size of estimated CSI when communication channels between a base station and a mobile station are time-varying channels. Based on the DPCM method, a prediction error between a predicted value of a signal and an actual value of the signal is transmitted from the mobile station to the base station, instead of the actual value of the signal being transmitted. As noted above, the estimated CSI includes information regarding time delays, magnitudes, and phases of selected channel taps for the communication channels. For time-varying channels, information regarding the magnitudes and the phases of the selected channel taps may vary with time, and information regarding the time delays of the selected channels taps may be assumed not to vary with time. Therefore, the mobile station may transmit the information regarding the magnitudes and the phases of the selected channel taps using the DPCM method.

For example, based on the above described least squares method or DCT method, the mobile station may generate parameters to represent the magnitudes of the selected channel taps. In addition, the mobile station may estimate the information regarding the phases of the selected channel taps. The mobile station may then perform the DPCM method to further reduce a data size of the generated parameters and/or the estimated information regarding the phases of the selected channel taps.

Figure 7:
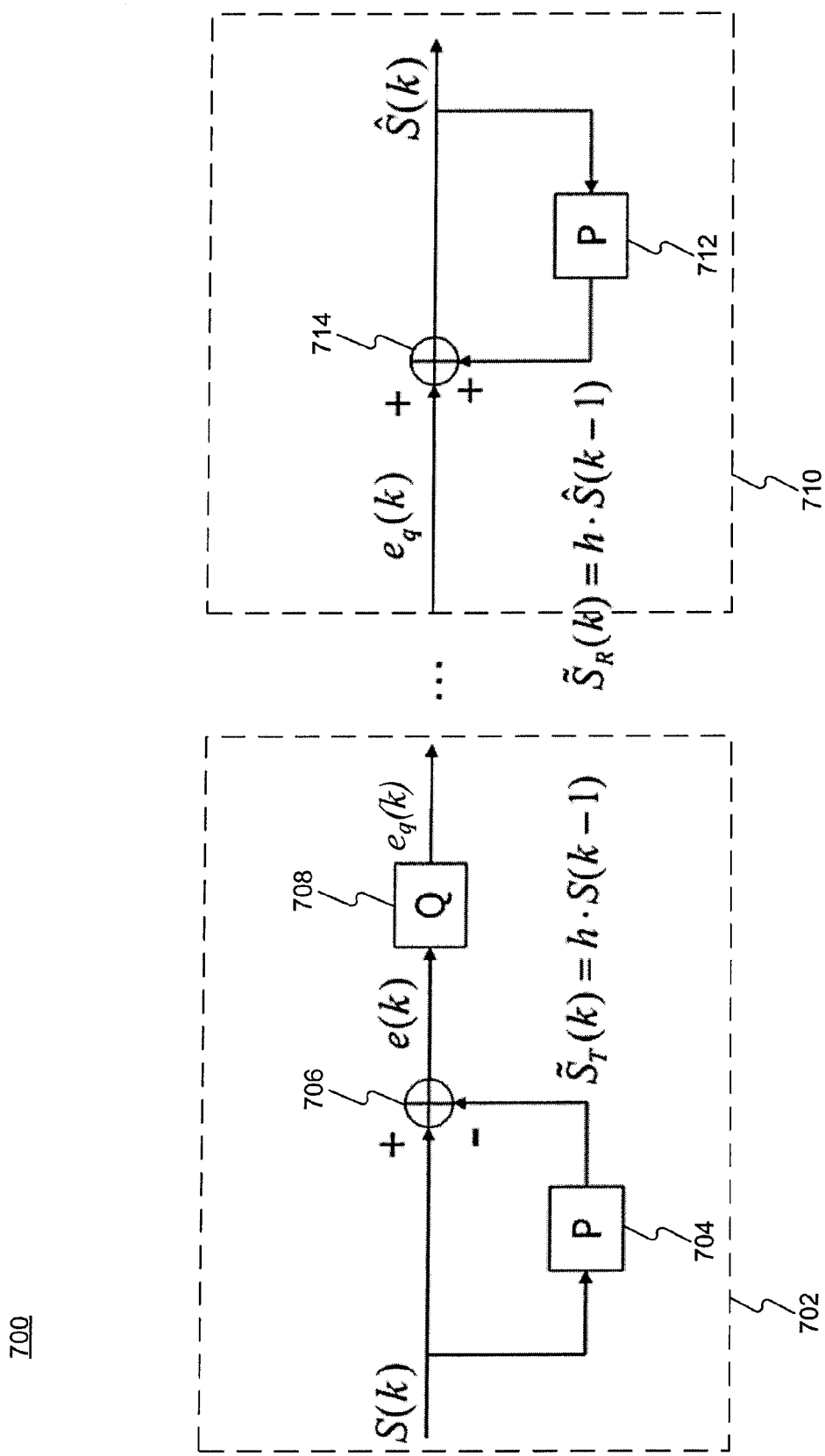
FIG. 7 illustrates an open-loop differential pulse code modulation (DPCM) method, according to an exemplary embodiment.

FIG. 7 illustrates an open-loop DPCM method 700, according to an exemplary embodiment. Referring to FIG. 7, a signal S is modulated at a mobile station 702 based on the open-loop DPCM method. For example, the mobile station 702 may be the mobile station 104 shown in FIG. 1, and may include a predictor 704, an adder 706, and a quantizer 708. The signal S may include information regarding the generated parameters for the magnitudes of the selected channel taps, or the estimated information regarding the phases of the selected channels taps, where the generated parameters and the phases may vary with time.

In one exemplary embodiment, the predictor 704 may predict a value of the signal S at a current time corresponding to a time index k, i.e., $\tilde{S}_T(k)$, based on an actual value of the signal S at a previous time corresponding to a time index k−1, i.e., S(k−1). For example, the predictor 704 may predict $\tilde{S}_T(k)$ based on S(k−1) using the following equation:

$$\tilde{S}_T(k)=h_0*S(k-1), \quad \text{Equation (7)}$$

where $h_0$ is a prediction parameter. The adder 706 may then calculate a value of a prediction error e at the current time corresponding to the time index k, i.e., e(k), using the following equation:

$$e(k)=S(k)-\tilde{S}_T(k), \quad \text{Equation (8)}$$

where S(k) is an actual value of the signal S at the current time corresponding to the time index k. The quantizer 708 further quantizes the prediction error e and transmits a quantized prediction error $e_q$ to a base station 710. For example, the base station 710 may be the base station 102 shown in FIG. 1.

In one exemplary embodiment, the base station 710 may include a predictor 712 and an adder 714. The base station 710 may generate a signal $\hat{S}$, which is a reconstruction of the signal S, based on the quantized prediction error $e_q$ received from the mobile station 702. For example, the predictor 712 may predict a value of the signal $\hat{S}$ at the current time corresponding to the time index k, i.e., $\tilde{S}_R(k)$, based on a value of the signal $\hat{S}$ at the previous time corresponding to the time index k−1, i.e., $\hat{S}(k-1)$. The predictor 712 may predict $\tilde{S}_R(k)$ based on $\hat{S}(k-1)$ using the following equation:

$$\tilde{S}_R(k)=h_0*\hat{S}(k-1), \quad \text{Equation (9)}$$

where $h_0$ is the prediction parameter noted above. The adder 714 may then calculate a value of the signal $\hat{S}$ at the current time corresponding to the time index k, i.e., $\hat{S}(k)$, using the following equation:

$$\hat{S}(k)=\tilde{S}_R(k)+e_q(k), \quad \text{Equation (10)}$$

where $e_q(k)$ is a value of the quantized prediction error $e_q$ at the current time corresponding to the time index k.

Figure 8:
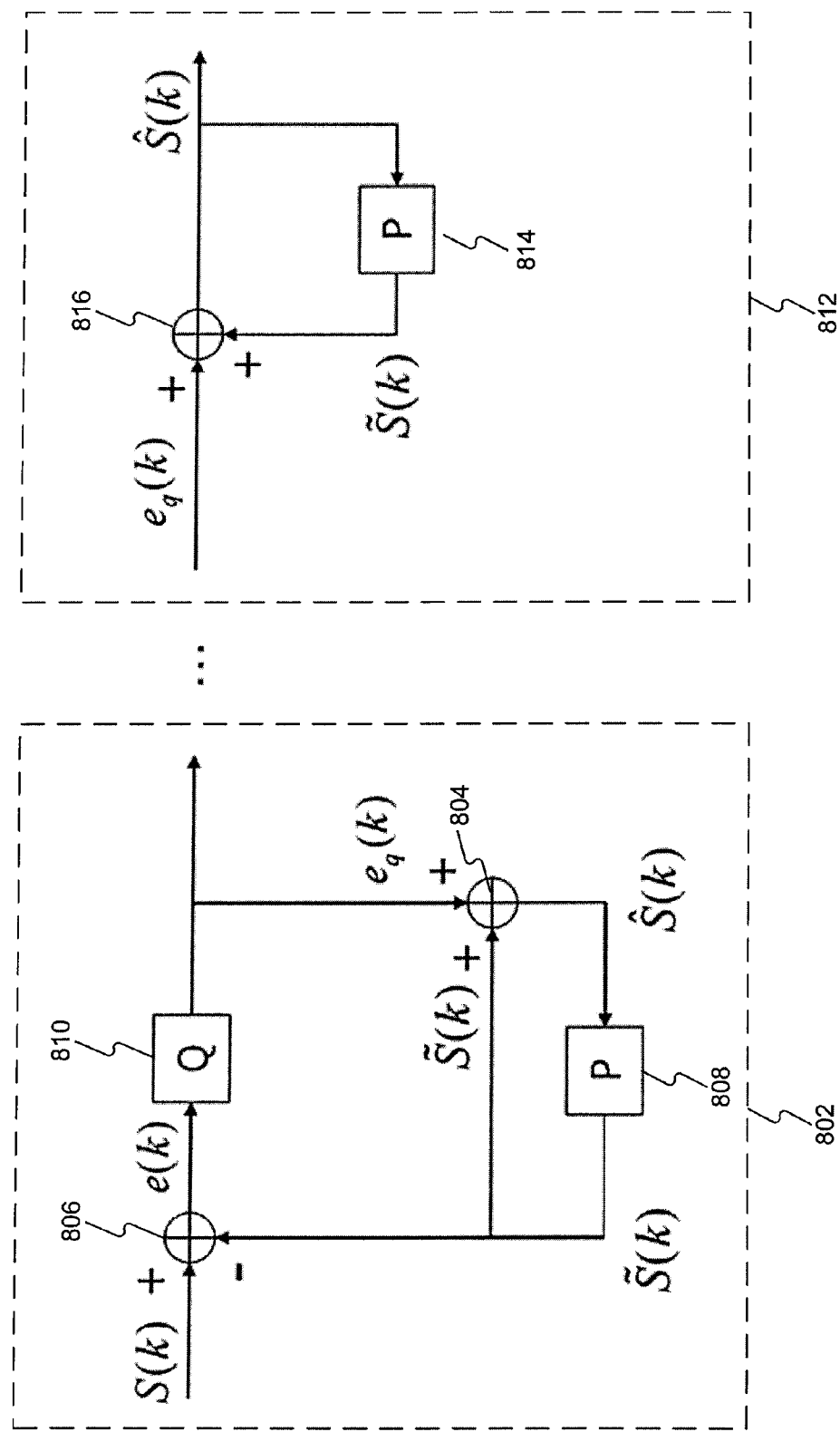
FIG. 8 illustrates a closed-loop DPCM method, according to an exemplary embodiment.

FIG. 8 illustrates a closed-loop DPCM method 800, according to an exemplary embodiment. Referring to FIG. 8, a signal S is modulated at a mobile station 802 according to the closed-loop DPCM method. For example, the mobile station 802 may be the mobile station 104 shown in FIG. 1, and may include first and second adders 804 and 806, a predictor 808, and a quantizer 810. The signal S may include information regarding the generated parameters for the magnitudes of the channel taps, or the estimated information regarding the phases of the channels taps, where the generated parameters and the phases may vary with time.

In one exemplary embodiment, the predictor 808 may predict a value of the signal S at a current time corresponding to a time index k, i.e., $\tilde{S}(k)$, based on a value of a signal $\hat{S}$, which is a reconstruction of the signal S, at a previous time corresponding to a time index k−1, i.e., $\hat{S}(k-1)$. The second adder 806 may then calculate a value of a prediction error e at the current time corresponding to the time index k, i.e., e(k), using the following equation:

$$e(k)=S(k)-\tilde{S}(k), \quad \text{Equation (11)}$$

where S(k) is an actual value of the signal S at the current time corresponding to the time index k. The quantizer 810 further quantizes the prediction error e and transmits the quantized prediction error $e_q$ to a base station 812. For example, the base station 812 may be the base station 102 shown in FIG. 1. In addition, the first adder 804 may generate a value of the signal $\hat{S}$ at the current time corresponding to the time index k, i.e., $\hat{S}(k)$, based on $\tilde{S}(k)$ and a value of the quantized prediction error $e_q$ at the current time corresponding to the time index k, i.e., $e_q(k)$.

In one exemplary embodiment, the base station 812 may include a predictor 814, which is substantially the same as the predictor 808, and an adder 816. The base station 812 may reconstruct the signal S based on the quantized prediction error $e_q$ received from the base station 802. For example, the predictor 814 predicts the value of the signal $\hat{S}$ at the current time corresponding to the time index k, i.e., $\tilde{S}(k)$, based on the value of the signal $\hat{S}$ at the previous time corresponding to the time index k−1, i.e., $\hat{S}(k-1)$. The adder 816 may then calculate a value of the signal $\hat{S}$ at the current time corresponding to the time index k, i.e., $\hat{S}(k)$, using the following equation:

$$\hat{S}(k)=\tilde{S}(k)+e_q(k), \quad \text{Equation (12)}$$

where $e_q(k)$ is the value of the quantized prediction error $e_q$ at the current time corresponding to the time index k.

In one exemplary embodiment, the base station and the mobile station are based on a spatial channel model (SCM) provided by a 3rd Generation Partnership Project (3GPP) standard. Accordingly, a calculated channel response of a communication channel between the base station and the mobile station may include six channel taps. Furthermore, the base station and the mobile station communicate based on an orthogonal frequency-division multiplexing (OFDM) technique. In addition, the mobile station may move at a speed of 20 kilometer/hour.

Figure 9A:
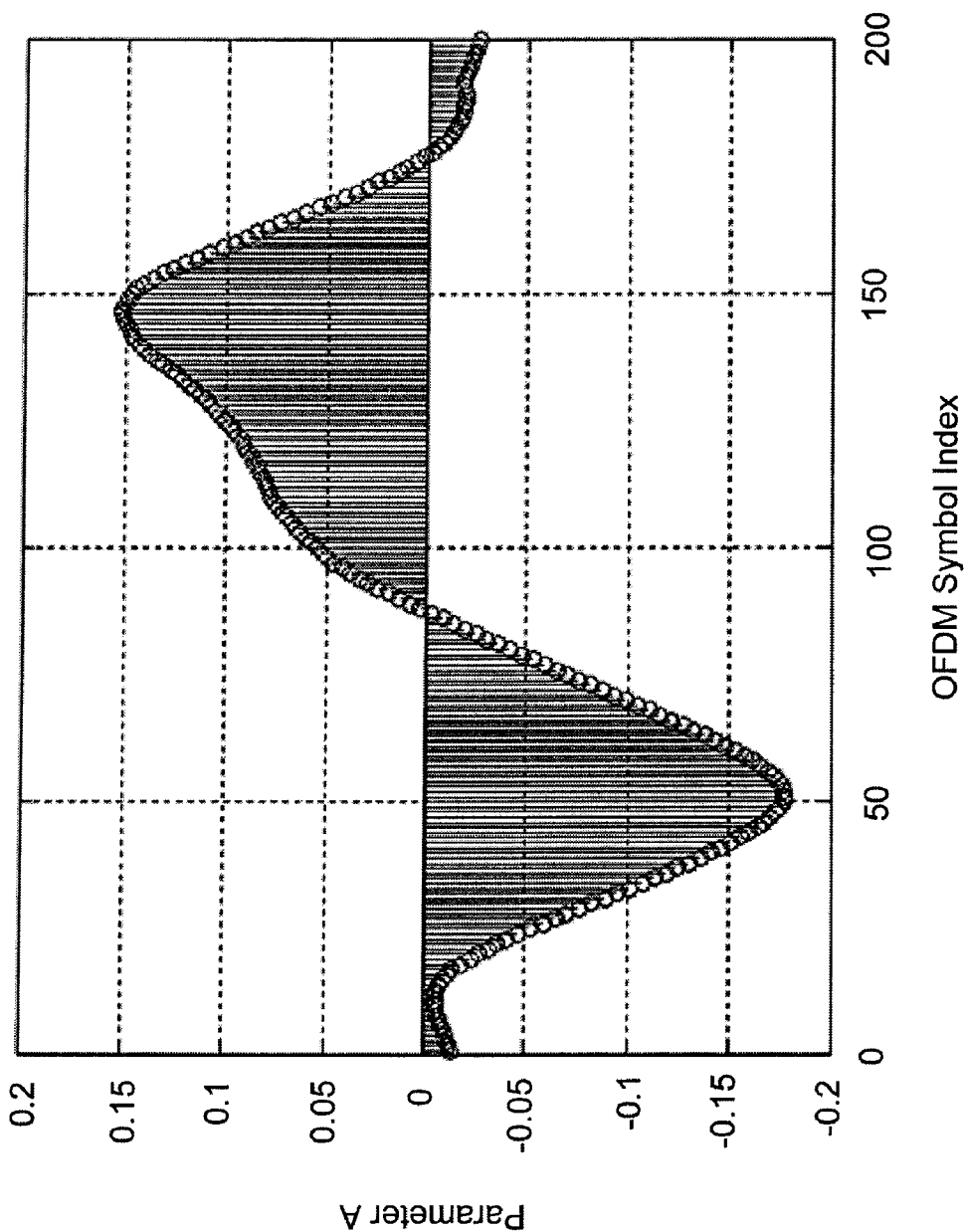
FIGS. 9A-9C show exemplary compressed, estimated channel state information (CSI) for a communication channel, according to an exemplary embodiment.
Figure 9B:
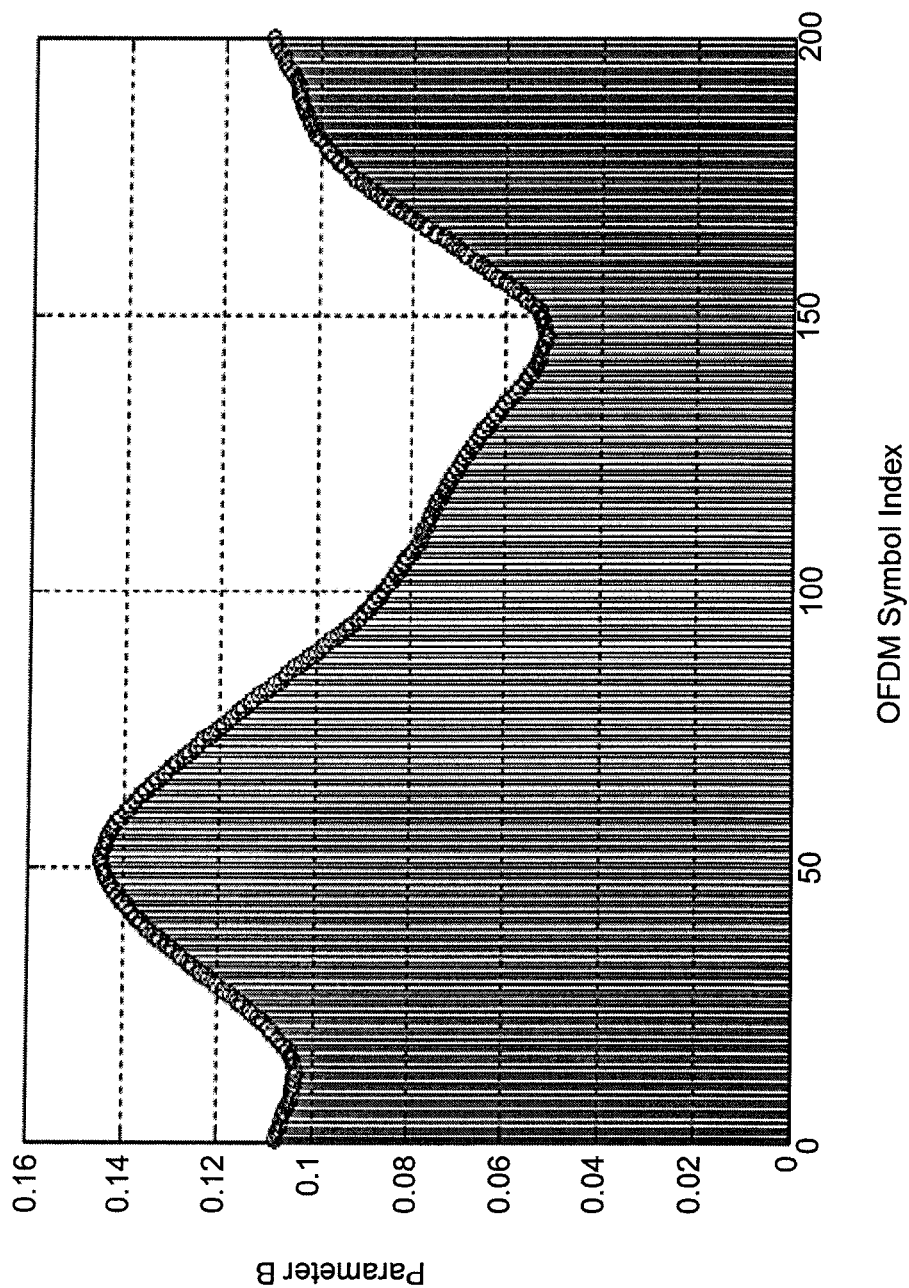
Figure 9C:
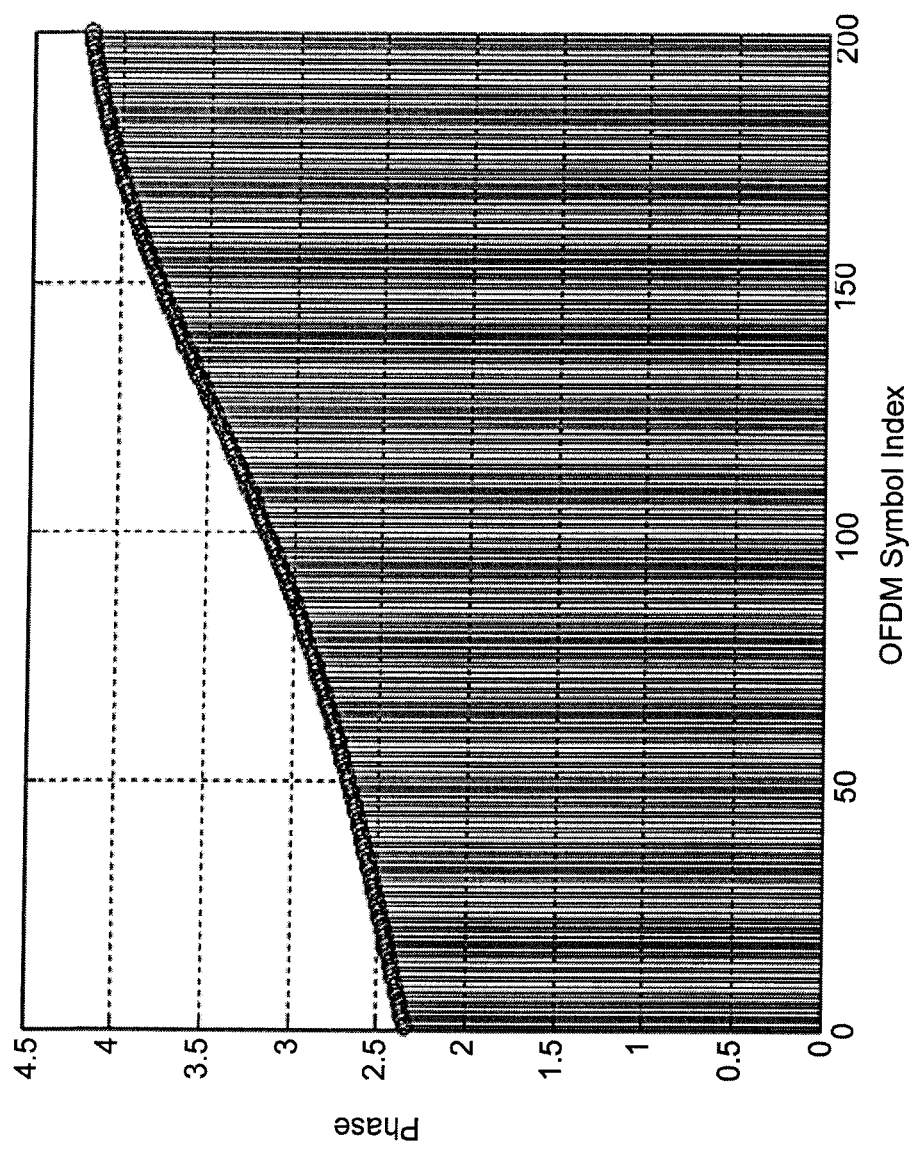

For example, the mobile station receives a plurality of frames of OFDM symbols from the base station, and each of the frames includes ten OFDM symbols. Based on the frames of OFDM symbols, the mobile station may estimate CSI for communication channels between the base station and the mobile station. FIGS. 9A-9C show exemplary compressed, estimated CSI for one of the communication channels, according to an exemplary embodiment. For example, FIGS. 9A and 9B show how parameters A and B change with OFDM symbol indexes, respectively. The parameters A and B are generated from magnitudes of channel taps in a channel response calculated for the communication channel, by using a line Y=A+BX to fit the magnitudes of the channel taps after sorting, as described above. FIG. 9C shows how phases of the channel taps change with OFDM symbol indexes.

In one exemplary embodiment, the mobile station may use the DPCM method described above to send to the base station the CSI estimated based on the first OFDM symbol in each of the frames. Typically, the channel response may not vary much in a period corresponding to one frame of OFDM symbols. Therefore the CSI estimated based on the first OFDM symbol in a frame may represent CSI for a period corresponding to a length of that frame.

Figure 10A:
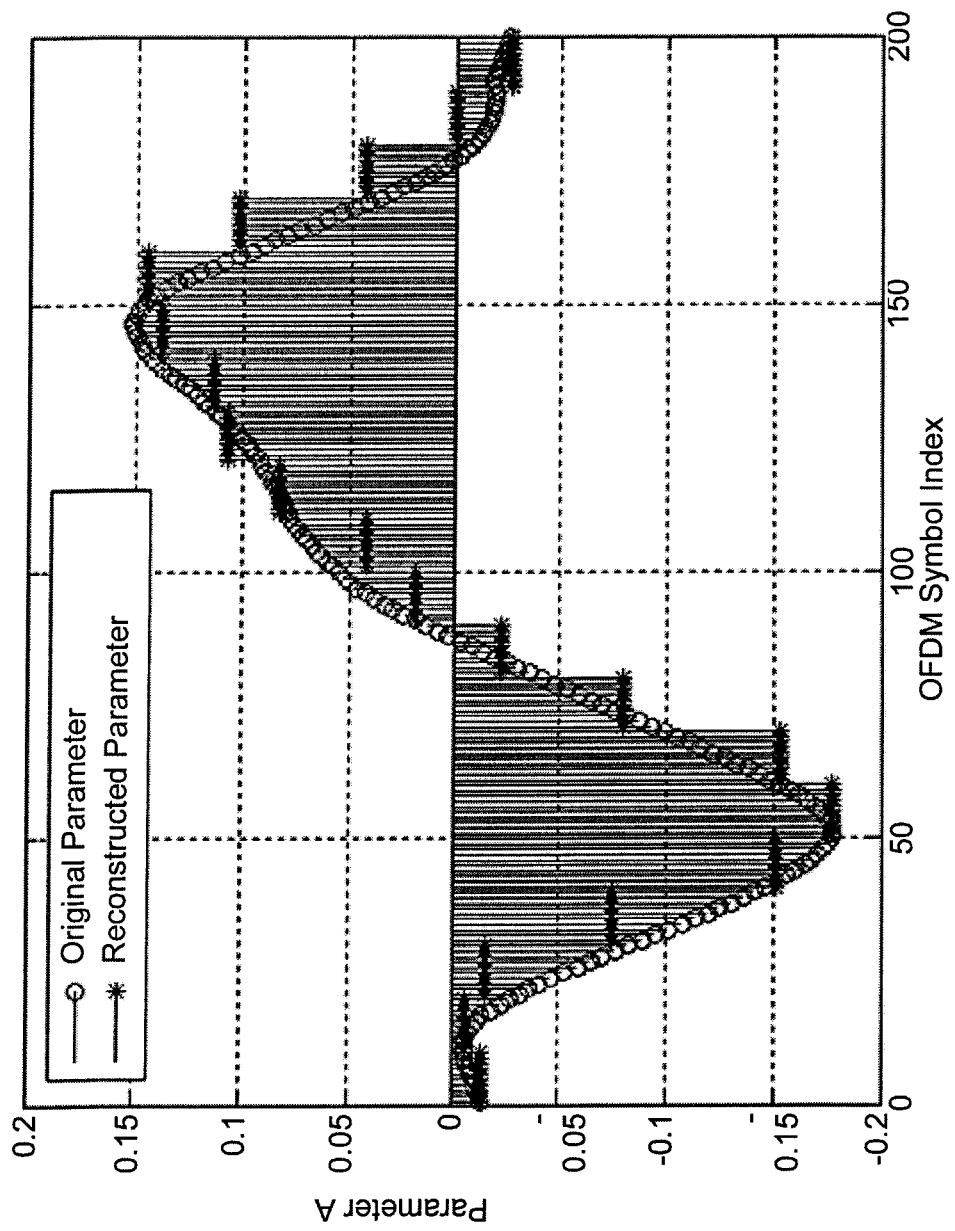
FIGS. 10A-10C show exemplary CSI reconstructed by a base station for a communication channel, according to an exemplary embodiment.
Figure 10B:
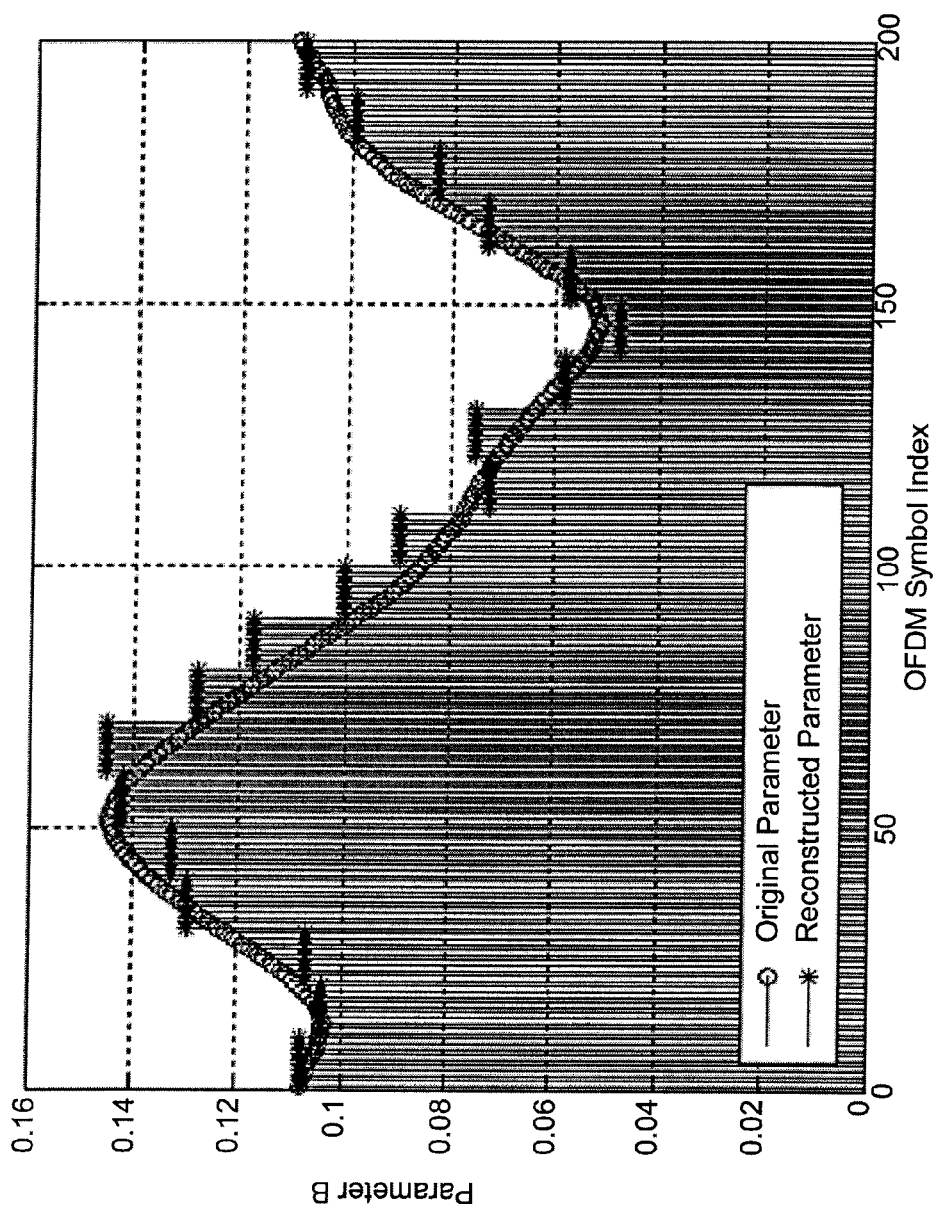
Figure 10C:
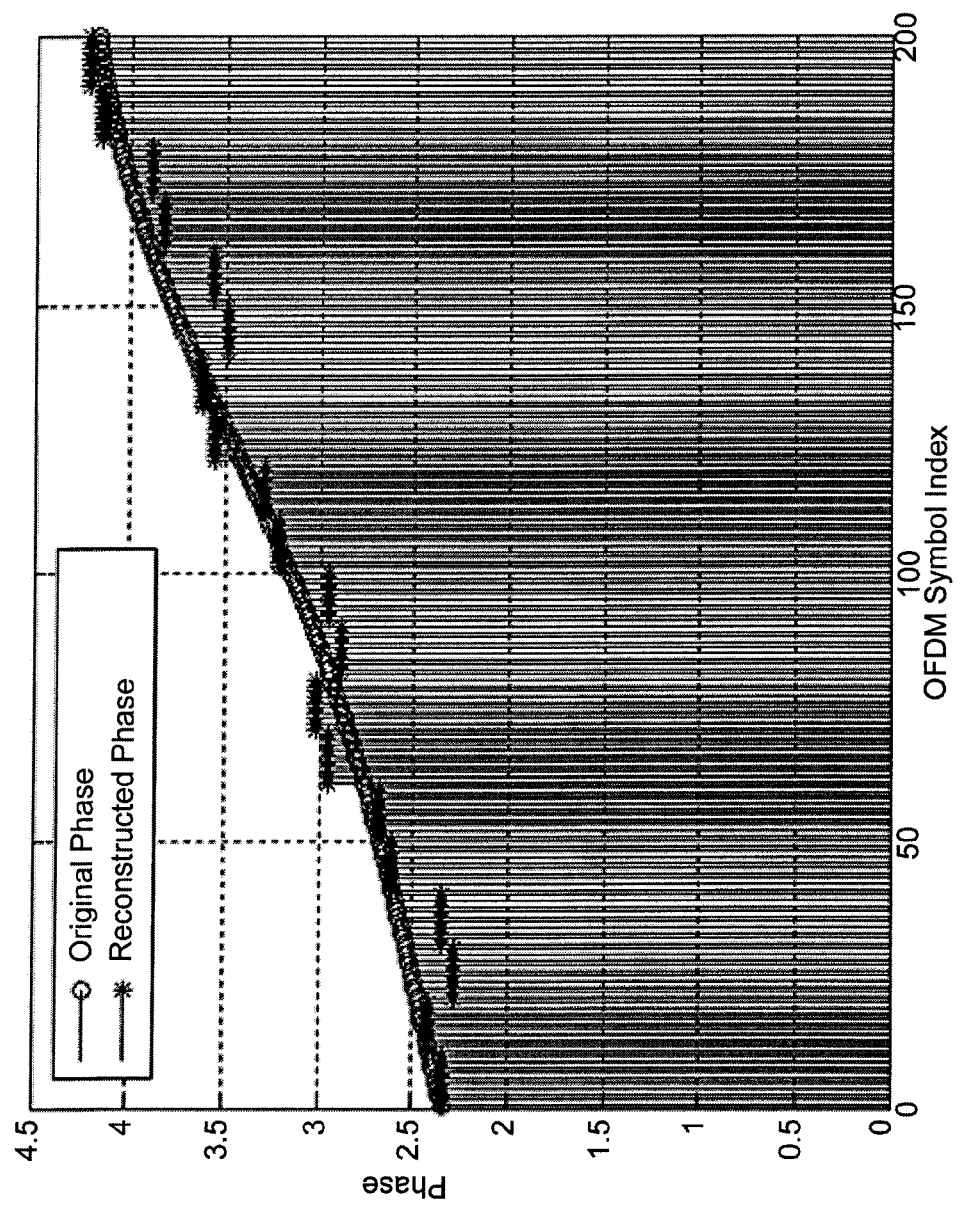

FIGS. 10A-10C show exemplary CSI reconstructed by the base station for the one of the communication channels, according to an exemplary embodiment. For example, the base station may reconstruct the CSI according to the DPCM method described above. FIGS. 10A and 10B show reconstructed parameters A and B, respectively. The reconstructed parameters A and B, indicated by the small stars in FIGS. 10A and 10B, are compared with the original parameters A and B generated by the mobile station, indicated by the small circles in FIGS. 10A and 10B. FIG. 10C shows reconstructed phases of the channel taps. The reconstructed phases, indicated by the small stars in FIG. 10C, are compared with the original phases estimated by the mobile station, indicated by the small circles in FIG. 10C.

Other embodiments of the invention will be apparent to those skilled in the art from consideration of the specification and practice of the invention disclosed here. The scope of the invention is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a mobile station to provide to a base station feedback of channel state information (CSI) regarding a plurality of communication channels between the mobile station and the base station, the method comprising:
   estimating the CSI by calculating a plurality of channel responses each for one of the communication channels;
   compressing the estimated CSI; and
   sending the compressed CSI as the feedback to the base station,
   wherein the estimating further comprises selecting a plurality of channel taps from each of the calculated channel responses to estimate the CSI.

2. The method of claim 1, wherein the compressing further comprises:
   generating a plurality of parameters to represent information regarding magnitudes of the channel taps.

3. The method of claim 2, wherein the generating further comprises:
   sorting, for each of the calculated channel responses, the magnitudes of the channel taps;
   fitting, for each of the calculated channel responses, the sorted magnitudes with a line or curve; and
   generating the plurality of parameters based on the line or curve.

4. The method of claim 3, wherein the fitting comprises:
   fitting the sorted magnitudes with a line or curve based on a least squares method.

5. The method of claim 2, wherein the generating further comprises:
   sorting, for each of the calculated channel responses, the magnitudes of the channel taps;
   performing a discrete cosine transform on the sorted magnitudes, to generate a spectrum of the sorted magnitudes, the spectrum including a plurality of values; and
   selecting ones of the values that have a relatively large magnitude as the plurality of parameters.

6. The method of claim 2, wherein the compressing comprises:
   performing a differential pulse code modulation on the generated parameters.

7. The method of claim 2, wherein the sending further comprises:
   quantizing the generated parameters before the sending.

8. The method of claim 1, wherein the compressing further comprises:
   performing a differential pulse code modulation on phases of the channel taps.

9. The method of claim 1, wherein the sending further comprises:
   quantizing information regarding phases of the channel taps in each of the calculated channel responses before the sending.

10. The method of claim 1, wherein the sending further comprises:
    quantizing information regarding time delays of the channel taps in each of the calculated channel responses before the sending.

11. A mobile station to provide to a base station feedback of channel state information (CSI) regarding a plurality of communication channels between the mobile station and the base station, the mobile station being configured to:
    estimate the CSI by calculating a plurality of channel responses each for one of the communication channels;
    compress the estimated CSI; and
    send the compressed CSI as the feedback to the base station,
    wherein estimating the CSI further comprises selecting a plurality of channel taps from each of the calculated channel responses to estimate the CSI.

12. The mobile station of claim 11, being a mobile station in a multi-input and multi-output communication system or an orthogonal frequency-division multiplexing based communication system.

13. The mobile station of claim 11, being further configured to:
    generate a plurality of parameters to represent information regarding magnitudes of the channel taps.

14. The mobile station of claim 13, being further configured to:
    sort, for each of the calculated channel responses, the magnitudes of the channel taps;
    fit, for each of the calculated channel responses, the sorted magnitudes with a line or curve; and
    generate the plurality of parameters based on the line or curve.

15. The mobile station of claim 13, being further configured to:
    sort, for each of the calculated channel responses, the magnitudes of the channel taps;
    perform a discrete cosine transform on the sorted magnitudes, to generate a spectrum of the sorted magnitudes, the spectrum including a plurality of values; and
    select ones of the values that have a relatively large magnitude as the plurality of parameters.

16. The mobile station of claim 13, being further configured to:
    perform a differential pulse code modulation on the generated parameters.

17. A method for a base station to acquire from a mobile station feedback of channel state information (CSI) regarding a plurality of communication channels between the base station and the mobile station, the method comprising:
    receiving the feedback from the mobile station, the feedback including compressed CSI; and
    reconstructing, based on the compressed CSI, a plurality of channel responses each for one of the communication channels,
    wherein the compressed CSI includes a first plurality of parameters representing information regarding magnitudes of channel taps for a first one of the plurality of communication channels, the reconstructing further comprising:

generating an approximation of the magnitudes of the channel taps for the first one of the communication channels based on the first plurality of parameters.

18. The method of claim 17, wherein the generating further comprises:
   generating a line or curve based on the first plurality of parameters; and
   generating the approximation of the magnitudes based on the line or curve.

19. The method of claim 17, wherein the compressed CSI includes a second plurality of parameters representing information regarding magnitudes of channel taps for the plurality of communication channels, the reconstructing further comprising:
   generating an approximation of the magnitudes of the channel taps for the plurality of communication channels based on the second plurality of parameters.

20. The method of claim 19, wherein the generating further comprises:
   generating an approximate spectrum of the magnitudes of the channel taps for the plurality of communication channels based on the second plurality of parameters; and
   performing an inverse discrete cosine transform on the approximate spectrum to generate the approximation of the magnitudes of the channel taps for the plurality of communication channels.

21. The method of claim 17, wherein the reconstructing further comprises:
   generating phases of the channel taps for the first one of the plurality of communication channels based on the compressed CSI.

22. The method of claim 17, wherein the reconstructing further comprises:
   generating time delays of the channel taps for the first one of the plurality of communication channels based on the compressed CSI.

23. A base station to acquire from a mobile station feedback of channel state information (CSI) regarding a plurality of communication channels between the base station and the mobile station, the base station being configured to:
   receive the feedback from the mobile station, the feedback including compressed CSI; and
   reconstruct, based on the compressed CSI, a plurality of channel responses each for one of the communication channels,
   wherein the compressed CSI includes a first plurality of parameters representing information regarding magnitudes of channel taps for a first one of the plurality of communication channels, the reconstructing further comprising:
   generating an approximation of the magnitudes of the channel taps for the first one of the communication channels based on the first plurality of parameters.

24. The base station of claim 23, being a base station in a multi-input and multi-output communication system or an orthogonal frequency-division multiplexing based communication system.

25. The base station of claim 23, being further configured to:
   generate an approximation of the magnitudes of the channel taps for the first one of the communication channels based on the first plurality of parameters.

26. The base station of claim 23, being further configured to:
   generate a line or curve based on the first plurality of parameters; and
   generate the approximation of the magnitudes based on the line or curve.

27. The base station of claim 23, wherein the compressed CSI includes a second plurality of parameters representing information regarding magnitudes of channel taps for the plurality of communication channels, the base station being further configured to:
   generate an approximation of the magnitudes of the channel taps for the communication channels based on the second plurality of parameters.

28. The base station of claim 27, being further configured to:
   generate an approximate spectrum of the magnitudes of the channel taps for the plurality of communication channels based on the second plurality of parameters; and
   perform an inverse discrete cosine transform on the approximate spectrum to generate the approximation of the magnitudes of the channel taps for the plurality of communication channels.

* * * * *